United States Patent [19]

Hansen

[11] Patent Number: 5,666,203
[45] Date of Patent: Sep. 9, 1997

[54] MEASUREMENT SYSTEM FOR DETECTING A GAP OF A ROLL PAIR

[75] Inventor: Manfred Hansen, Düsseldorf, Germany

[73] Assignee: Mannesmann Aktiengesellschaft, Düsseldorf, Germany

[21] Appl. No.: 708,032

[22] Filed: Aug. 30, 1996

[30] Foreign Application Priority Data

Aug. 31, 1995 [DE] Germany .................. 195 33 584.8

[51] Int. Cl.$^6$ .................. G01B 11/14; G01B 11/06; G01N 21/00
[52] U.S. Cl. .................. 356/375; 356/373; 356/381; 250/559.27
[58] Field of Search .................. 356/373, 375, 356/381, 384, 385; 250/559.29, 559.27

[56] References Cited

U.S. PATENT DOCUMENTS

| | | | |
|---|---|---|---|
| 3,640,109 | 2/1972 | Ashton et al. | 72/37 |
| 3,834,820 | 9/1974 | Bock | 356/164 |
| 3,902,713 | 9/1975 | Von Luhmann et al. | 271/154 |
| 4,182,259 | 1/1980 | Garner et al. | 118/712 |
| 5,075,622 | 12/1991 | Konii et al. | 324/229 |
| 5,317,386 | 5/1994 | Marcus et al. | 356/372 |

FOREIGN PATENT DOCUMENTS

| | | | |
|---|---|---|---|
| 2617179 | 5/1986 | United Kingdom | 356/381 |

*Primary Examiner*—Frank G. Font
*Assistant Examiner*—Zandra V. Smith
*Attorney, Agent, or Firm*—Cohen, Pontani, Lieberman & Pavane

[57] ABSTRACT

A measurement system for determining a gap of a roll pair by scanning the position of the roll body ends on the side facing away from the roll gap. The system includes a lever bar arranged on a carrying structure and carrying a height-adjustable optical scanning device. A position element is arranged to rest on the roll barrel and is located in the optical beam path between a transmitter and a receiver of the scanning device and changes in the position of the position element can be detected by the scanning device. The transmitter, designed on the basis of a laser, and the receiver, designed as a photo receiver, are located in a common housing, into the interior of which gas can be introduced at an overpressure. The position element is attached in a vertically movable fashion via an articulated lever on the housing and consists of a glide plate resting on the roll barrel and a position measurement plate. The measurement plate is arranged vertically on the glide plate and extends in a freely movable fashion through a slot in the housing wall into the optical beam path between the transmitter and the receiver and at least partially covers it with a sharp measurement edge embodied on the position measurement plate.

9 Claims, 1 Drawing Sheet

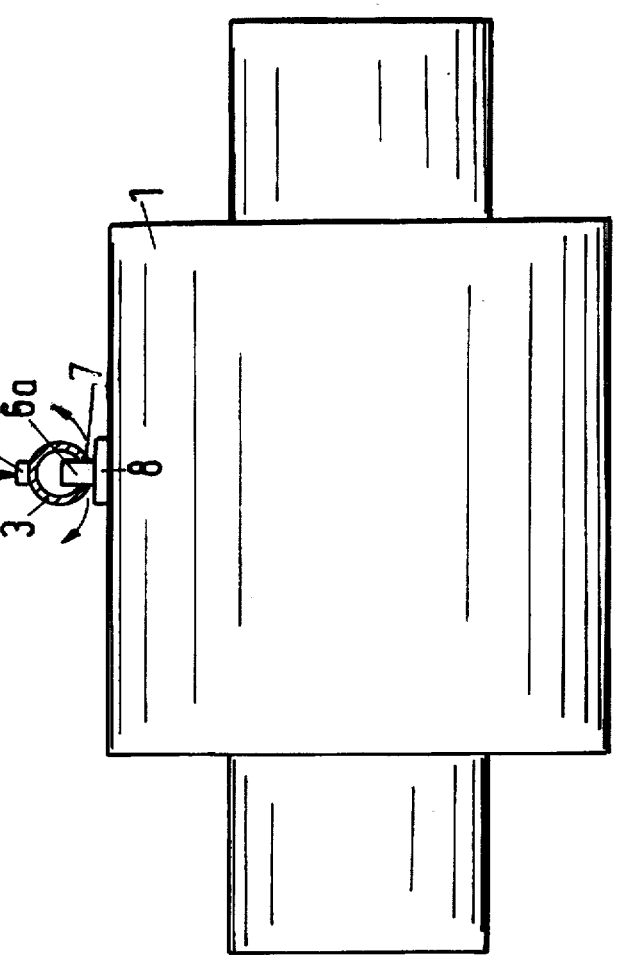
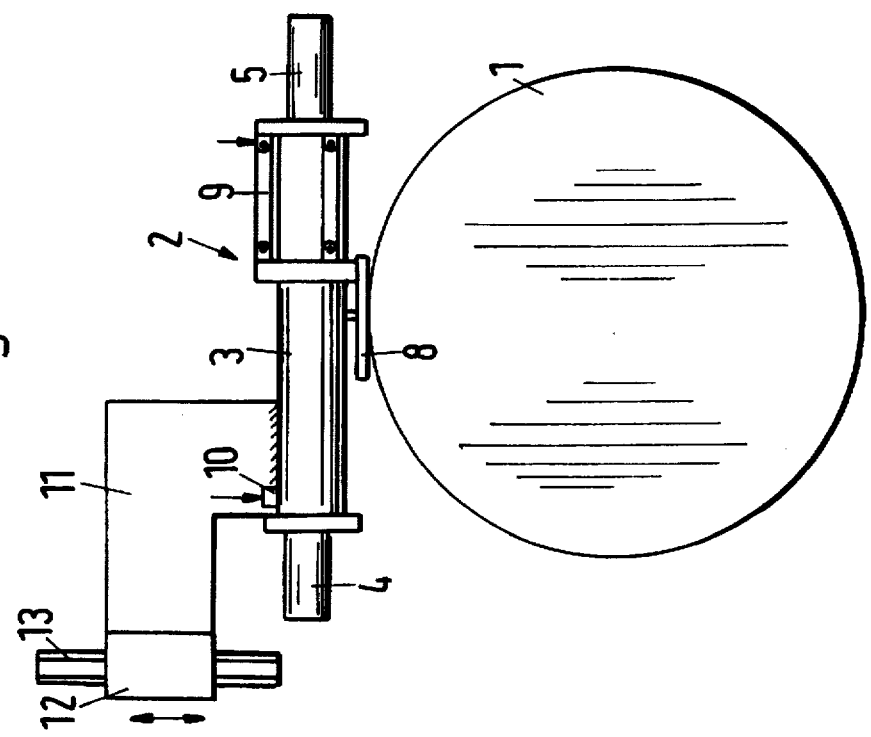

MEASUREMENT SYSTEM FOR DETECTING A GAP OF A ROLL PAIR

FIELD OF THE INVENTION

The invention relates to a measurement system for detecting a gap of a roll pair by scanning the position of the roll body ends on the side facing away from the roll. Such a system includes a lever bar arranged on a carrying structure and carrying a height-adjustable optical scanning device, as well as a position element, which rests on the roll body and is located in the optical beam path between a transmitter and a receiver of the scanning device. A position change of the position element can be detected by the scanning device.

DESCRIPTION OF THE PRIOR ART

DE 42 03 469 C discloses a measurement system in which the positions of the roll body ends of the support rolls are detected in a contact-free fashion by optical devices arranged on lever bars. The reference point is located next to the roll stand. The scanning devices are preferably optical devices based on lasers, i.e., the transmitter is a laser, and the receiver is usually a photodiode. Alternatively, the optical transmitter can also be designed as a diode line camera equipped with a monochrome light source. Accurate detection of the roll body ends is achieved by means of glide shoes, which can be provided with a defined measurement edge and placed in gliding fashion onto the roll body ends. The scanning device is height-adjustable and thus can be adjusted to the diameter of the roll sets.

During measurement, the glide shoes rest in the crown area on the roll body ends of the support rolls, so that the glide shoes directly follow the vertical movements of the roll body ends. During measurement, the defined measurement edge embodied on the opposite ends of the glide shoes is located in the optical beam path between the transmitter and the receiver. For example, when the transmitter is a laser, 50% of the laser beam is covered by the measurement edge of the glide shoe; i.e., only 50% of the light intensity reaches the photo receiver. A movement of the measurement edge of the glide shoe, resulting from a movement of the corresponding roll body end, causes an increase or a decrease in the light intensity measured by the photo receiver, depending on whether the roll body end moves up or down; and the change in position of the roll body ends follows a change in the roll gap opening. This measurement process is meant to permit highly accurate contact-free measurement of the roll gap opening, even in hot rolling mills. The "roll body end" is said to be a suitable measurement point at which favorable environmental conditions prevail, so that non-distorted measurement values can be expected. Optical detection is intended to rule out further measurement inaccuracies, which are unavoidable when contact-based measurement devices are used.

It is disadvantageous in this, particularly, optical measurement process that the extremely unfavorable environmental conditions that prevail in hot rolling mills make the optical detection of the position of the roll body ends almost impossible. In particular, the steam created during the roll cooling distorts measurement values and thus prevents accurate measurement. The dust created during the rolling process has the same effect. Steam and dust are deposited on the optical surfaces of the scanning device so that regular cleaning is needed at frequent intervals. Additionally, steam and dust result in spontaneously fluctuating reductions in the transmitted light intensity in the beam path between the transmitter and the receiver. These fluctuations are superimposed on the measurement signal and lead to distortion of the measurement values for the gap opening. It is not possible to correct the measurement value because the sharp fluctuations in environmental conditions are random in nature.

A further measurement system is known from DE 15 48 871 A1. This system uses a system of lenses and deflection mirrors that is expensive and also relatively susceptible to malfunction.

SUMMARY OF THE INVENTION

Accordingly, it is an object of the present invention to provide a measurement system with which, particularly in hot rolling mills, the roll gap opening can be detected as accurately and in as interference-free a manner as possible.

Pursuant to this object, and others which will become apparent hereafter, one aspect of the present invention resides in a measurement system having a support structure, a lever bar arranged on the support structure, and height-adjustable optical scanning means arranged on the support structure. The scanning means include a housing, a laser transmitter arranged at one end of the housing and a photoreceiver arranged at an opposite end of the housing. A position element is arranged so as to be restable on a roll body and positionable in an optical beam path between the transmitter and the receiver of the scanning means so that a change in position is detectable by the scanning means. An articulated lever is connected between the housing and the position element so that the position element is vertically movable. The position element includes a glide plate configured to be restable on the roll body and a position measurement plate mounted vertically on the glide plate so as to extend in a freely movable fashion through a slot in a wall of the housing into the optical beam path between the transmitter and the receiver. The position measurement plate has a sharp upper measurement edge that is configured to at least partially block the receiver.

The measurement system according to the invention has the advantage, first of all, that measurement results are no longer distorted by unfavorable environmental conditions, particularly steam and dust, which are usually present in hot rolling mills. The optical detection of the changes in position of the roll body ends naturally excludes further measurement inaccuracies, which cannot be avoided in measurement devices that work by contact.

In one embodiment of the inventive measurement system, the transmitter and the receiver of the scanning device are arranged in a common housing, and the housing wall can be penetrated by the position element in a freely movable fashion. In order to prevent the entrance of dust, steam and the like into the interior of the housing, a gas is introduced into the interior at an overpressure. This ensures that measurements are carried out under defined optical conditions; specifically; accurate optical measurement is made possible for the first time.

Preferably, the position element is attached to the scanning device via an articulated lever on the housing. As a result, the scanning device is a unit that can be moved as a whole, which simplifies positioning at the start of measurement and also at each roll change. An increase in measurement accuracy is achieved, in particular, by virtue of the fact that the articulated lever is designed in the form of a parallelogram lever. During measurement this special lever form prevents the position element from tilting relative to the vertical direction. Advantageously, the position element is a position plate with a sharp edge, which is arranged vertically on a glide plate, which in turn rests in gliding fashion on the measurement object.

In another embodiment, the housing wall of the scanning device has an opening in the lower central area of the housing. The opening is a slot that is oversized (relative to the position element) and can be penetrated by the position element in a freely movable fashion. Advantageously, dry clean air is the gas introduced into the housing interior through an opening in the housing wall. The gas is extracted, in particular, through the slot.

The transmitter is preferably a laser with a suitable beam diameter; in particular, the laser can be a laser diode. Advantageously, a photo receiver or, alternatively, a diode line camera is provided as the receiver.

Expansions of the roll stands and the like do not distort measurement results when the carrying structure is secured to the foundation. Securing the carrying structure lends the mechanical stability necessary for the optical collection of measurement values.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 is a front view of measurement system for detecting a gap of a roll pair, pursuant to the present invention; and FIG. 2 is a cross-section of the measurement system in FIG. 1 through the position measurement plate.

DETAILED DESCRIPTION OF THE PREFERRED EMBODIMENTS

The inventive system is illustrated schematically in the drawings. FIG. 1 shows a front view of the measurement system for detecting a gap of a roll pair. Reference number 1 indicates the support roll of the roll stand and the working roll conventionally arranged below the support roll 1 is not shown. In the case of a four-roll stand, for example, the working roll and the support roll are opposite one another in pairs. The spacing of the working rolls defines the roll gap. Above the support roll 1 is an optical scanning device 2 having a housing 3. The housing 3, which in the illustrated embodiment is designed in tubular fashion, is closed on one face with an attachment unit for a laser diode 4 and on the opposite face with an attachment unit for a photo receiver 5. The optical beam path inside of the housing 3 runs horizontally and is partially interrupted by a position measurement plate 6a arranged in the beam path. The maximum sensitivity of the scanning device is achieved when 50% of the effective beam diameter is covered by the position measurement plate 6a. The position measurement plate 6a is arranged vertically relative to the beam path and penetrates the housing wall in a freely movable fashion through an oversized slot 7 embodied in the lower crown area of the housing 3. Outside of the housing 3, the position measurement plate 6a is attached vertically to a glide plate 8, which in turn is attached in swingable fashion via an articulated lever 9 to the housing 3. In addition, the articulated lever 9 can be provided with a spring, which pulls the articulated lever 9 (and thus the glide plate in FIG. 1) downward. In order to prevent steam, dust and the like from entering the housing 3, the housing 3 is provided with an opening 10 through which a gas can be introduced into the interior of the housing 3 at an overpressure. Advantageously, the gas used is clean dry air.

As FIG. 1 also shows, the optical scanning device 2 is attached via a lever bar 11 to a movement device 12 for the purpose of vertically moving the scanning device 2. The movement device 12 is arranged on a carrying structure 13 (only indicated in FIG. 1), which is placed on the foundation of the roll stand. As a result, the optical scanning device 2 is height-adjustable and thus can be adjusted to the diameter of the roll set. At the same time, the reference point is located next to the roll stand, which increases the measurement accuracy of the measurement system for detecting the roll gap width.

FIG. 2 shows a cross-section of the measurement system in FIG. 1 at the position measurement plate 6a. In this example, the optical scanning device 2 is centered relative to the roll length. Of course, the scanning device 2 can be arranged at any desired point along the working roll 1, i.e., even at the roll body ends. The preferred arrangement is the arrangement at the roll barrel ends.

In order to operate the measurement device, the device in the arrangement shown in FIG. 1 is moved via the movement device 12 out of a rest position slowly downward into a working position. Furthermore, dry clean air or an inert gas is introduced at a slight overpressure through the opening 10 into the interior of the housing 3. Because the articulated lever 9 is swung downward, the position measurement plate 6a does not cover the effective beam diameter or covers it only slightly. When the glide plate 8 comes to rest on the support roll 1, the position measurement plate 6a moves slowly into the beam path between the laser diode transmitter 4 and the receiver 5. The scanning device 2 has reached the optimum working position when 50% of the effective beam diameter is covered by the position measurement plate. In this position, the output signal of the photo receiver 5 is reduced to 50% of its original value. If the vertical position of the support roll 1 changes, moving upward or downward, then the position measurement plate 6a in the beam path changes accordingly, as a result of which more or less light falls on the photo receiver 5. In the case of small horizontal movements of the position measurement plate 6a, the change in the light intensity lying on the photo receiver 5 is proportional to the change in the gap width of the working roll pair.

The invention is not limited by the embodiments described above which are presented as examples only but can be modified in various ways within the scope of protection defined by the appended patent claims.

I claim:

1. A measurement system for detecting a roll gap of a roll pair in a roll stand by scanning a roll body on a side facing away from the roll gap, comprising: a support structure; a lever bar arranged on the support structure; height-adjustable optical scanning means arranged on the support structure, the scanning means including a housing, a laser transmitter arranged at one end of the housing, and a photoreceiver arranged at an opposite end of the housing; a position element arranged so as to be restable on a roll body and positionable in an optical beam path between the transmitter and the receiver of the scanning means so that a change in position is detectable by the scanning means; and an articulated lever connected between the housing and the position element so that the position element is vertically movable, the position element including a glide plate configured to be restable on the roll body and a position measurement plate mounted vertically on the glide plate so as to extend in a freely movable fashion through a slot in a wall of the housing into the optical beam path between the transmitter and the receiver, the position measurement plate having a sharp upper measurement edge configured to at least partially block the receiver.

2. A measurement system as defined in claim 1, wherein the articulated lever is a parallelogram lever.

3. A measurement system as defined in claim 1, wherein the receiver is a photodiode.

4. A measurement system as defined in claim 1, wherein the receiver is a diode line camera.

5. A measurement system as defined in claim 1, wherein the housing is filled with a gas at an overpressure.

6. A measurement system as defined in claim 1, wherein the support structure is configured to be securable to a foundation of the roll stand.

7. A measurement system as defined in claim 5, wherein the gas is dry air.

8. A measurement system as defined in claim 5, wherein the gas is an inert gas.

9. A measurement system as defined in claim 5, wherein the housing is provided with an opening through which the gas is introducible.

* * * * *